June 21, 1955  J. F. KOPCZYNSKI  2,711,221
DRIVE MECHANISM FOR TANDEM MOUNTED OBLATE WHEELS
Filed July 5, 1950  2 Sheets-Sheet 1

INVENTOR.
John F. Kopczynski,
BY
Parker, Firschman & Farmer,
Attorneys.

June 21, 1955  J. F. KOPCZYNSKI  2,711,221
DRIVE MECHANISM FOR TANDEM MOUNTED OBLATE WHEELS
Filed July 5, 1950  2 Sheets-Sheet 2

INVENTOR,
John F. Kopczynski,
BY
Parker, Prochnow & Farmer,
Attorneys.

United States Patent Office 2,711,221
Patented June 21, 1955

2,711,221

DRIVE MECHANISM FOR TANDEM MOUNTED OBLATE WHEELS

John F. Kopczynski, Buffalo, N. Y.

Application July 5, 1950, Serial No. 172,091

8 Claims. (Cl. 180—22)

This invention relates to traction devices for use in connection with the propulsion of motor vehicles. This is a continuation-in-part of my copending application Serial No. 60,027, filed November 15, 1948, and since abandoned.

As pointed out in my Patent No. 2,256,570, there are certain advantages in driving or traction wheels which have oblate circular or approximately elliptical peripherical portions which contact the ground. In the use of wheels of this type, however, it is necessary to provide a mounting of the same which will prevent alternate up and down motion of the vehicle during the rotation of the wheels.

One of the objects of this invention is to provide a mounting of improved construction for oblate circular vehicle wheels.

Another object is to provide a mounting of this type in which the wheels transmit up and down motion of the axes thereof alternately to the opposite ends of a beam, the middle portion of which is pivotally connected with the vehicle, so that the up and down motions of the wheels resulting from the oblate circular form thereof will not be transmitted to the vehicle.

A further object is to provide an improved drive mechanism for a traction device of this type.

A still further object is to provide an improved housing for a traction unit of this type.

Various other objects and advantages will be apparent from the following description of an embodiment of this invention, and the novel features will be particularly pointed out hereinafter in the appended claims.

Figure 1:
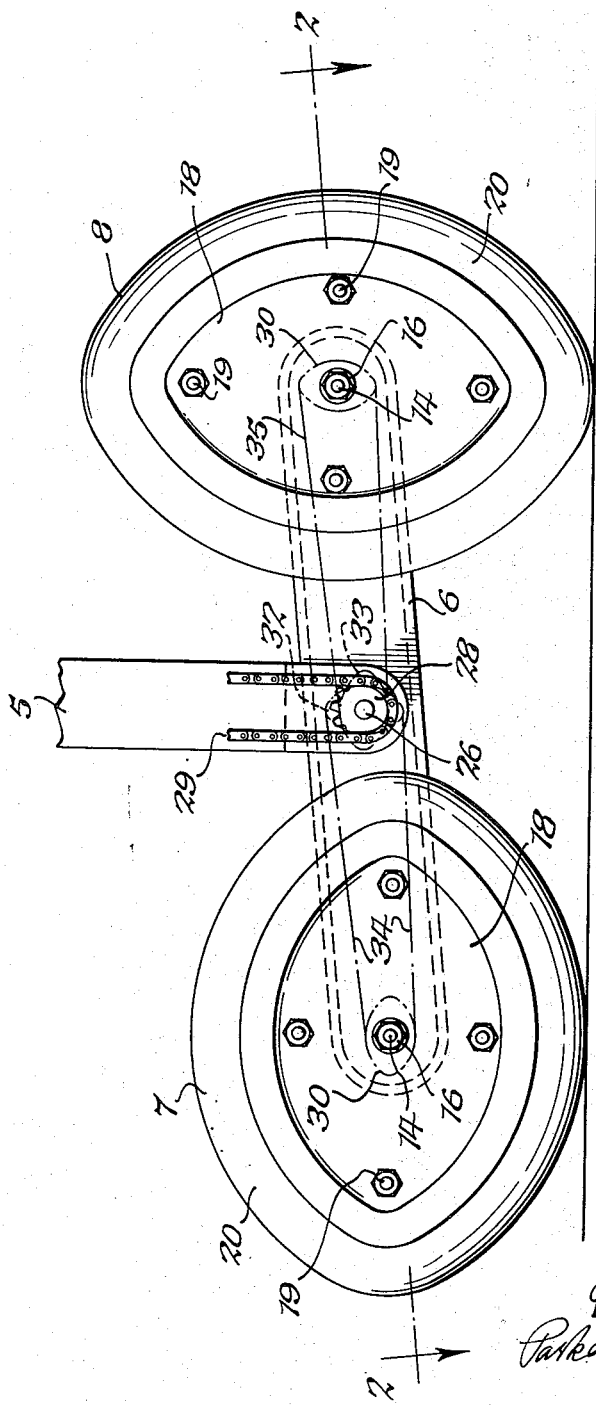
Fig. 1 is a side elevation of a traction device embodying this invention.
Figure 2:
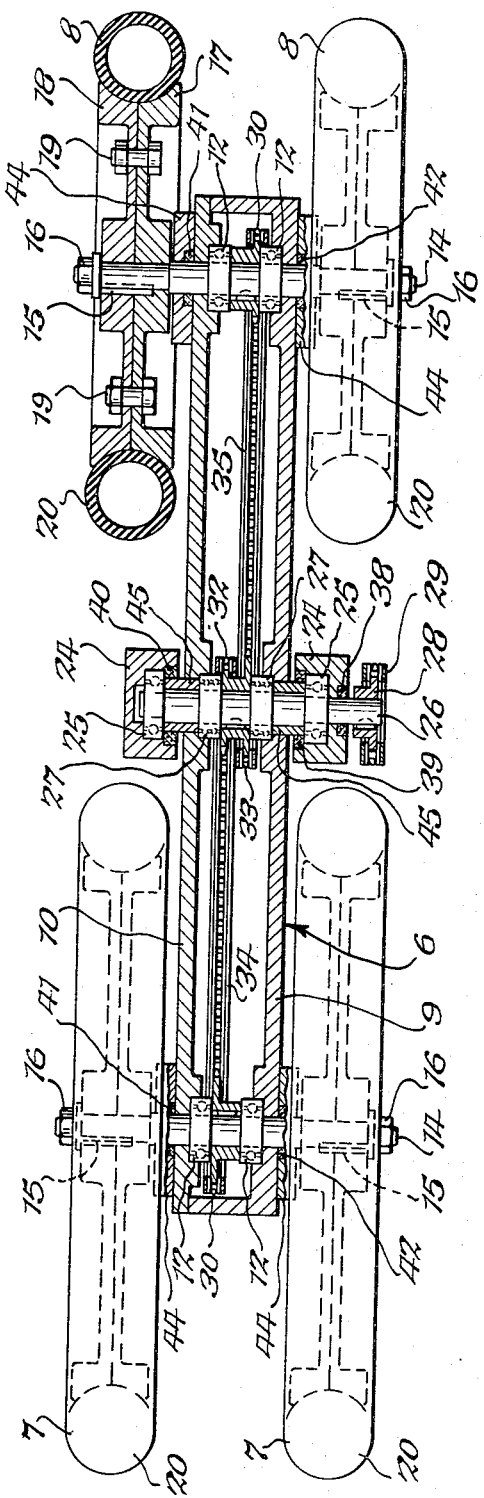
Fig. 2 is a sectional plan view thereof on line 2—2, Fig. 1.

In the particular embodiment of the invention shown in the drawings, 5 represents a part which is mounted on the vehicle and which extends downwardly therefrom and to the lower end of which is pivoted the middle portion of a rocking beam 6. This beam may, however, be pivoted on the vehicle in any other desired manner on a pivot extending transversely of the vehicle. The ends of the beam have ground wheels 7 and 8 of oblate, circular or substantialy eliptical form journalled thereon. In the construction shown in Fig. 2, two pairs of wheels 7 and 8 are provided, but it will be understood that only a single wheel may be mounted on each end of the beam 6.

The beam 6 is preferably of hollow or box-like form and consists of a housing for a part of the driving connections for the wheels. The beam, in the construction shown by way of example, includes a box-shaped member 9 open toward one side of the traction device, and a cover plate 10 closes the open side of the box-shaped member 9. The beam is provided adjacent the opposite ends thereof with suitable bearings 12 for wheel shafts or axles 14 on which the ground wheels 7 and 8 are rigidly secured, for example, by means of keys 15 and nuts 16 engaging threaded ends of the wheel shafts 14. The wheels shown are each formed in two halves 17 and 18 secured together by bolts 19, and carrying tires 20, but it will be understood that wheels of any other suitable or desired construction may be employed in connection with my traction device.

Any suitable or desired construction may be provided for pivotally mounting the middle portion of the beam on the frame members 5, and in the construction shown for this purpose, the lower end of the vehicle part 5 is bifurcated or yoke-shaped straddling the beam and including two downwardly extending parts 24 each having bearings 25 for a combined pivot and drive shaft 26. This shaft 26 is rotatably supported on the beam by means of bearings 27 suitably secured to the parts 9 and 10 of the beam. The beam may, however, be pivotally mounted on the vehicle independently of said drive shaft.

Rotary motion may be imparted to the combined pivot and drive shaft 26 in any suitable manner, a sprocket wheel 28 secured on an outer end portion of the shaft and driven by a sprocket chain 29 being shown for this purpose in the construction illustrated. The sprocket chain may be driven by any suitable means, not shown. Preferably, however, the pivotal axis of the beam is concentric with the drive shaft 26.

In view of the fact that an oblate circular or elliptical wheel, if rotated at a constant rate of rotation will advance to a greater extent over the ground when the portion of the wheel of greater radius contacts the ground than when the portion of lesser radius is in contact with the ground, means are provided for driving the wheels 7 and 8 at varying speeds of rotation during each revolution of the wheel, so that the distance over the ground traversed by each wheel during any portion of the revolution thereof will be the same during each fractional part of rotation thereof. This is accomplished in the particular construction illustrated by providing each wheel axle 14 with a sprocket wheel 30 of oblate circular or elliptical form rigidly secured thereto, and by providing sprocket wheels 32 and 33 of similar form secured to the drive shaft 26 with their major axes extending at approximately right angles to each other, the sprocket wheel 32 being connected with the sprocket wheel 30 on the shaft or axle 14 of the wheel or wheels 7 by means of the sprocket chain 34, and the sprocket wheel 30 of the other ground wheel or pair of ground wheels 8 being connected with the sprocket wheel 33 by means of a chain 35. The four sprocket wheels are so secured to the drive shaft 26 and the wheel axles 14 that the ground wheels 7 and 8 will be rotated at a slightly higher speed of rotation when the portion of the wheels of lesser radius contact the ground, and at a lower speed of rotation when the portions of the wheels of greater radius contact the ground. As clearly shown in the drawings, this is accomplished by forming the sprocket wheels of oblate circular or substantially elliptical form and arranging the sprocket wheels 30 on the wheels axles so that their major axes will be arranged substantially parallel to the major axes of the ground wheels wtih which they are rigidly connected. In other words, the major axis of the sprocket 30 mounted on the axle on which the ground wheels 7 are mounted extends substantially parallel to the major axis of the wheels 7, and a similar relationship exists between the ground wheels 8 and the other sprocket 30 which is secured to the axle of the ground wheels 8. Similarly, the sprocket wheels 32 and 33 on the drive shaft 26 are preferably so arranged that the major axis of the sprocket wheel 32 will at all times be at approximately 90 degrees from the major axis of the sprocket wheel 30 driving the ground wheels 7, and the major axis of the sprocket wheel 33 will also be at all times at approximately 90 degrees from the major axis of the sprocket wheel 30 driving the wheels 8 through the chain 35. In other words, when the major axis of a sprocket wheel on the shaft 26 is substantially vertical, the major axis of the sprocket wheel on a ground wheel axle 14 driven thereby will be substantially horizontal. By means of this connection of the ground wheels with the driving shaft 26, the wheels 7, when in the position shown in the drawings, will be rotated about their axes at a higher rate of speed of rotation while their portions of lesser radius are in contact with the ground, than the ground wheels 8 which have their portions of larger radius in contact with the ground. Consequently, the wheels 8 in the positions shown in the drawings will not tend to traverse the ground at a higher speed than the wheels 7. Any other suitable mechanism for producing similar rotation of the wheels relatively to each other may be employed.

By means of the construction shown, it will be obvious that during the rotation of the wheels 7 and 8, the beam 6 will swing about the axis of the combined drive and pivot shaft 26 as the wheels rotate, and during the oscillation of the beam, the axis of the pivot shaft 26 will remain at the same distance above the ground, so that no up and down motion resulting from the oblate circular form of the wheels will be transmitted through the part 5 to the vehicle.

The construction shown has the advantage that the driving parts for the wheels, such as the sprocket wheels and chains, may be located within the hollow beam 6 so as to be protected against dirt, water and foreign material. The bearings 25 may be protected against dirt and moisture by means of the grease-retaining sleeves or bushings 38 and 39 on one of the legs 24 of the yoke member, and by means of the grease-retaining ring or bushing 40 on the other leg. Similar grease-retaining bushings 41 and 42 may be provided at opposite sides of the beam about the axles or shafts 14, these rings or bushings being held in place by means of retainer blocks 44 suitably secured to the sides of the beam 6. 45 represents spacing sleeves suitably secured to the beam and engaging the bearings 25 to hold the beam in correctly spaced relation to the downwardly extending yoke members 24.

The traction device described is particularly desirable for use on tractors and other vehicles which may operate over soft or irregular ground, since the oblate circular wheels will not tend to slip and dig themselves into the ground or into snow. The construction described may, however, be used on good roads or hard pavements. The traction device as shown may be used on a vehicle having a pair of steering wheels spaced apart to provide stability, or if desired, a pair of these traction devices may be used to replace the rear wheels of the vehicle.

It will be understood that various changes in the details, materials and arrangements of parts which have been herein described and illustrated in order to explain the nature of the invention, may be made by those skilled in the art within the principle and scope of the invention as expressed in the appended claims.

I claim as my invention:

1. A traction device for a vehicle including a pair of ground wheels of oblate circular ground-engaging periphery, each having major and minor axes disposed at approximately right angles to each other, and arranged one in advance of the other in the direction of travel of the traction device, a beam on the opposite end portions on which said wheels are journalled and the middle portion of which is pivotally mounted on a vehicle on an axis extending transversely of the vehicle, an oblate, driven sprocket wheel coupled to each ground wheel and having major and minor axes at approximate right angles to each other, and the major axes of each ground wheel and connected sprocket wheel parallel to each other, a horizontal drive element rotatably mounted on said vehicle with its axis of rotation coincident with the axis of rocking of said beam, a pair of oblate driving sprocket gears, each with major and minor axes at approximate right angles to each other and fixed side by side at their centers on said drive element for rotation therewith, the major axes of said sprocket gears being fixed on said driving element while at approximate right angles to each other, a sprocket chain running on and drivingly connecting one sprocket wheel with one of said sprocket gears, with the major axis of that sprocket wheel at approximate right angles to the major axis of that one of the sprocket gears to which that same sprocket wheel is connected, and another sprocket chain connecting and providing a driving connection between, the other of said sprocket wheels and the other of said sprocket gears, with the major axis of said other sprocket wheel disposed at an approximate right angle to the major axis of said other sprocket gear.

2. A traction device for a vehicle including a beam pivoted intermediate of its ends on said vehicle to rock about an axis extending transversely of said vehicle, a pair of ground wheels of oblate circular ground-engaging periphery each wheel having a major and minor axes, said wheels being journalled on the end portions of said beam about axes parallel to the pivotal axis of said beam, a rotatable driving shaft coaxial with the pivotal mounting of said beam, a pair of oblate circular sprocket gears fixed on said shaft to rotate therewith, each having major and minor axes crosswise of each other, and their major axes disposed angularly at right angles to each other, and with the centers of both coincident with the axis of said shaft, an oblate circular sprocket wheel fixed to each wheel, and each having major and minor axes crosswise of each other and intersecting at the axis of rotation of the wheel, with the major axis of each ground wheel and its attached sprocket wheel disposed parallel to each other, a pair of sprocket chains, each connecting a sprocket wheel to a sprocket gear, with the major axes of the chain connected sprocket gear and sprocket wheel disposed at approximate right angles to each other, and with the major axis of one wheel horizontal when the major axis of the other wheel is vertical.

3. A traction device for a vehicle including a beam pivoted intermediate of its ends on said vehicle to swing about an axis extending transversely of said vehicle, ground wheels rotatably journalled on the opposite end portions of said beam to rotate on axes extending parallel to said pivotal axis of said beam, said wheels having oblate circular ground-engaging peripheries, a driving shaft journalled on said beam intermediate of the ends thereof and coaxial with the pivot of said beam, a pair of elliptical driving sprocket wheels fixed on said shaft to rotate therewith and having their major axes making right angles to each other, a driven sprocket wheel of similar elliptical form mounted in fixed relation on each of said ground wheels to rotate therewith, each driven sprocket wheel having its major axis extending parallel to the major axis of the ground wheel on which it is mounted, and a pair of sprocket chains each connecting a sprocket wheel of said shaft with a sprocket wheel of a ground wheel, with the major axes of each pair of chain-connected sprocket wheels at right angles to each other.

4. A traction device for a vehicle including a beam pivoted intermediate of its ends on said vehicle to rock about an axis extending transversely of said vehicle, a pair of ground wheels of oblate circular ground-engaging periphery journalled on each end portion of said beam with the wheels of each pair arranged at opposite sides of said beam, the wheels of each pair being arranged with their major axes parallel and coupled to each other to rotate together in that relation, and the major axes of one pair being arranged at approximately 90 degrees to the major axes of the other pair, a driving shaft rotatably mounted on said beam and having oblate sprocket gears fixed thereon at the center of their major axes and with their major axes disposed at right angles to each other, an oblate sprocket wheel coupled to each pair of ground wheels with the intersection of the major and minor axes of each sprocket wheel disposed in the axis of rotation of the ground wheels of that pair and with the major axes of that pair of ground wheels and sprocket wheel coupled thereto parallel to each other, and a pair of driving chains, one connecting one sprocket gear with one sprocket wheel and the other chain connecting the other sprocket gear with the other sprocket wheel, the major axes of each chain-connected sprocket gear and sprocket wheel being disposed at right angles to each other.

5. A traction device for providing a rolling support for one part of a vehicle, a horizontal shaft disposed in a position crosswise of the direction of travel of the vehicle and mounted for rotation on said vehicle, means connected to said shaft for rotating it, a beam disposed to extend in a direction forwardly and rearwardly of the direction of travel of the vehicle and pivotally supported, intermediate of its ends, on said vehicle for oscillation about an axis substantially coincident with the axis of rotation of said shaft, a ground wheel mounted on each end of said beam for rotation about a horizontal axis parallel to said shaft, the peripheral tread of each wheel being oblate with a major and a minor axis, a pair of driving sprockets coupled to said shaft for rotation therewith, a driven sprocket coupled to each wheel for rotation therewith, a chain connecting and providing a driving connection between each driving sprocket and a corresponding one of the driven sprockets, said sprockets all having their teeth arranged in oblate endless rows and also having major and minor axes, the major axes of the corresponding sprockets of each chain-connected pair extending in directions crosswise of each other, the major axis of the tread of each wheel and of the driven sprocket wheel coupled thereto being disposed in parallel relation to each other, the major axes of the wheel treads being disposed in directions crosswise of each other, and said pair of driving sprockets having their major axes extending in directions crosswise of each other, whereby the rate of rotation of each wheel will be faster when the major axis of that wheel is generally horizontal than when it is generally upright.

6. A traction device for providing a rolling support for one part of a vehicle, a horizontal shaft disposed in a direction crosswise of the direction of travel of the vehicle and mounted for rotation on said vehicle, means carried by said vehicle and connected to said shaft for rotating it, a beam disposed to extend in a direction forwardly and rearwardly of the direction of travel of the vehicle and pivotally supported, intermediate of its ends, on said vehicle for oscillation about an axis substantially coincident with the axis of rotation of said shaft, a ground wheel mounted on each end of said beam for rotation about an axis parallel to said shaft, the peripheral tread of each being oblate with a major and a minor axis, a pair of driving sprockets of generally elliptical form fixed on said shaft for rotation therewith and having their major axes extending in directions crosswise of each other, a driven sprocket coupled to each wheel for rotation therewith, each driven sprocket being generally elliptical in shape and having its major axis parallel to the major axis of the tread of the ground wheel to which it is attached, a chain connecting and providing a driving connection between each driving sprocket and one of the driven sprockets, the major axes of each pair of chain-connected driving and driven sprockets extending in directions crosswise of each other, the major axis of the oblate tread of the wheel on the forward end of the beam extending generally vertically when the major axis of the oblate tread of the wheel on the rear end of the beam extends generally horizontally.

7. A traction device for a vehicle including a beam pivoted intermediate of its ends on said vehicle to swing about an axis extending transversely of said vehicle, ground wheels rotatably journaled on the opposite end portions of said beam to rotate on axes extending parallel to said pivotal axis of said beam, said wheels having oblate circular ground-engaging peripheries, a shaft journaled on said beam intermediate of the ends thereof and rotatable about the pivotal axis of said beam, a pair of oblate circular driving sprocket wheels secured on said shaft to rotate therewith with their major axes arranged at approximately 90 degrees from each other, driven oblate sprocket wheels mounted in fixed relation on said ground wheels to rotate therewith and having their major axes at right angles to each other and the major axes of each driven sprocket parallel to the major axis of the ground wheel to which it is attached, and a pair of sprocket chains each connecting a sprocket wheel of said shaft with a sprocket wheel of a ground wheel, with the major axes of the sprocket wheels that are connected by a chain disposed at approximately right angles to each other.

8. A traction device for a vehicle including a beam extending in the direction of travel of the vehicle, a support mounting said beam intermediate of its ends for rocking movement about a horizontal axis, a driving shaft mounted for rotation and disposed coaxial with the rocking axis of said beam, a pair of ground wheels, with oblate ground-engaging peripheries rotatably supported on opposite ends of said beam, a similar, variable speed, positive geared drive from said shaft to each wheel coupling the wheels to said shaft with the major axes of the oblate peripheries of the wheels extending in directions at approximately right angles to each other, said drive employing oblate gears on said shaft and said ground wheels, said gears coupling the shaft and each wheel and having their major axes at right angles to each other, and the major axes of the periphery of each ground wheel and the oblate gear thereon being parallel to each other.

References Cited in the file of this patent

UNITED STATES PATENTS

| | | |
|---|---|---|
| 528,145 | Carr | Oct. 30, 1894 |
| 599,211 | Williams | Feb. 15, 1898 |
| 1,449,163 | Brandes | Mar. 20, 1923 |
| 2,213,473 | Peterman | Sept. 3, 1940 |
| 2,256,570 | Kopczynski | Sept. 23, 1941 |
| 2,280,741 | Bolster et al. | Apr. 21, 1942 |
| 2,362,068 | Hollmann et al. | Nov. 7, 1944 |

FOREIGN PATENTS

| | | |
|---|---|---|
| 638,340 | France | May 22, 1928 |